United States Patent [19]

Karr

[11] 4,059,052

[45] Nov. 22, 1977

[54] FUZE MODULATION SYSTEM

[75] Inventor: Philip R. Karr, Torrance, Calif.

[73] Assignee: The United States of America as represented by the Secretary of the Army, Washington, D.C.

[21] Appl. No.: 641,783

[22] Filed: Feb. 21, 1957

[51] Int. Cl.$^2$ .................................. F42C 13/04
[52] U.S. Cl. ..................................... 102/70.2 P
[58] Field of Search ............... 102/70.2; 343/14, 5; 250/83.1

[56] References Cited

U.S. PATENT DOCUMENTS

| 2,341,351 | 2/1944 | Barkley | 102/70.2 P |
|---|---|---|---|
| 2,433,361 | 12/1947 | Harrison | 343/14 |
| 2,522,367 | 9/1950 | Guanella | 343/14 |
| 2,711,529 | 6/1955 | Shanahan | 343/14 |

FOREIGN PATENT DOCUMENTS

| 552,351 | 4/1943 | United Kingdom | 102/70.2 P |

*Primary Examiner*—Charles T. Jordan
*Attorney, Agent, or Firm*—Nathan Edelberg; Robert P. Gibson; Saul Elbaum

EXEMPLARY CLAIM

1. An improved noise-modulated distance-measuring fuze comprising in combination an oscillator; a transmitting antenna coupled to said oscillator for radiating a signal towards a target; a modulator coupled to said oscillator to cause frequency modulation thereof, said modulator comprising a random noise generator, a band-pass shaper connected to the output of said noise generator for frequency shaping the random noise output thereof, a limiter coupled to said band-pass shaper for amplitude shaping the frequency-shaped noise output thereof, an integrator coupled to said limiter for integrating the frequency-shaped and amplitude-shaped output thereof, and means connecting the output of said integrator to said oscillator in such a manner as to frequency modulate said oscillator; a receiving antenna adapted to receive a portion of the signal radiated from said transmitting antenna after reflection from a target; mixer means for mixing the received signal from said receiving antenna with a local signal taken from said oscillator to produce a difference-frequency mixer output signal, said mixer output signal having a frequency spectrum peaked at a frequency greater than zero that decreases with decrease of fuze-to-target distance, the frequency at which the mixer output signal is peaked and the broadness of the spectrum in the vicinity thereof for a given fuze-to-target distance being dependent upon the characteristics of said band-pass shaper and said limiter; and means coupled to said mixer and responsive to the frequency at which said mixer output signal is peaked for functioning the fuze at a predetermined fuze-to-target distance.

3 Claims, 18 Drawing Figures

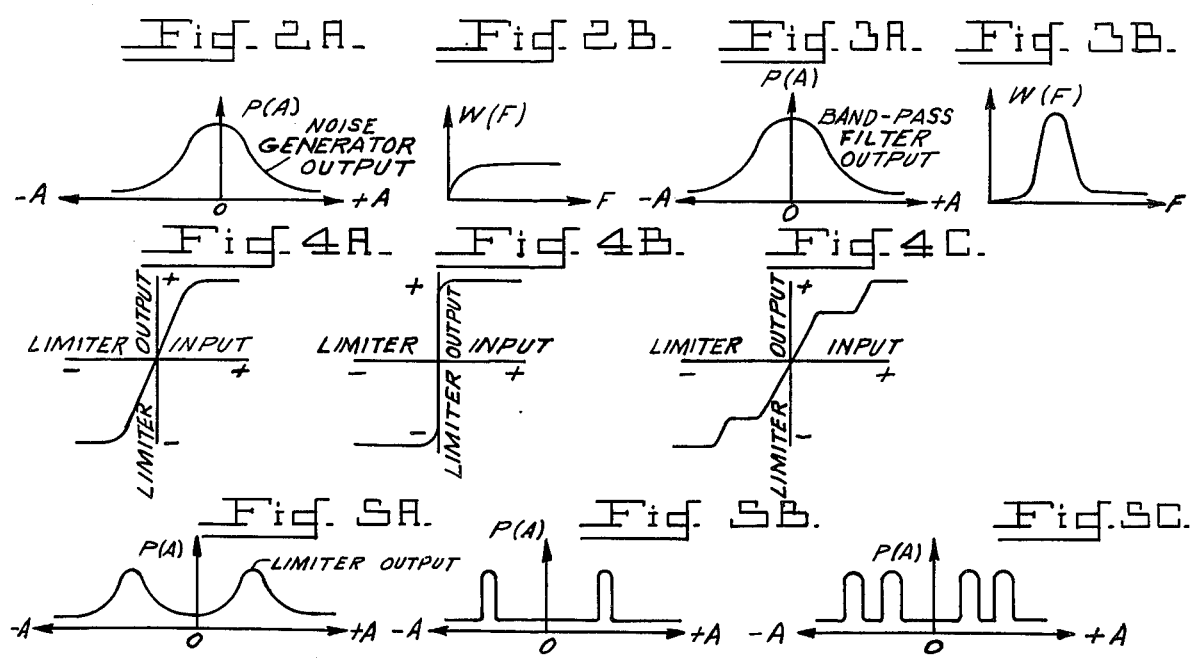
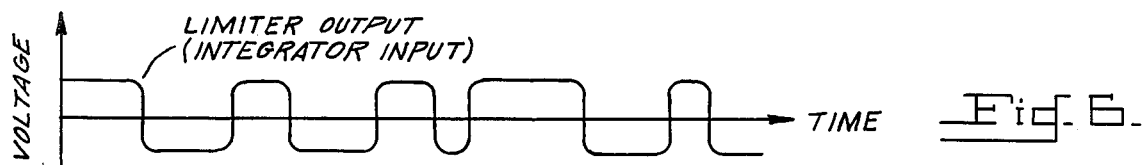
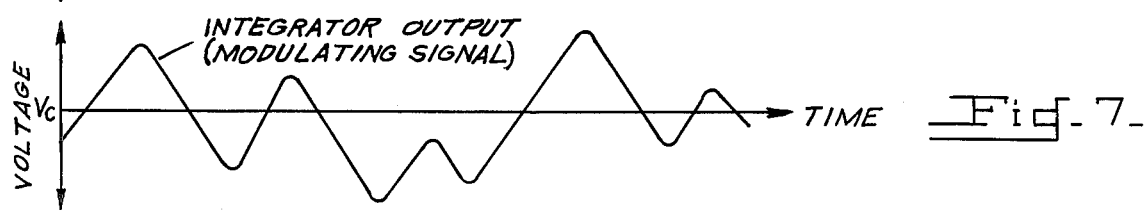
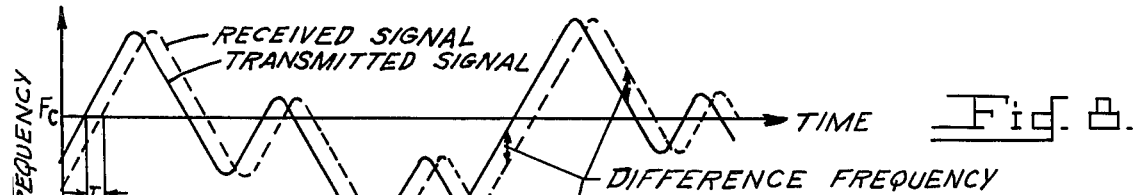
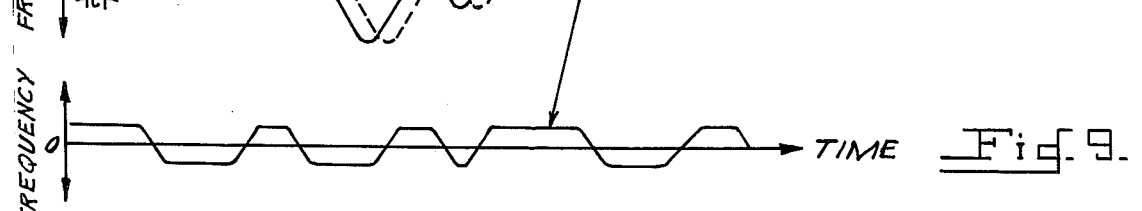
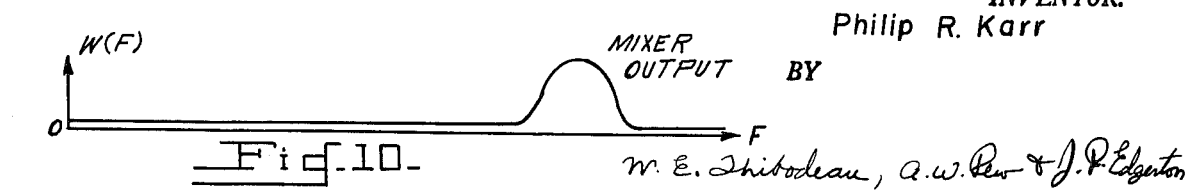

INVENTOR.
Philip R. Karr

FUZE MODULATION SYSTEM

The invention described herein may be manufactured and used by or for the Government for governmental purposes without the payment to me of any royalty thereon.

A recently invented radio type proximity fuze, known as the noise fuze, has an oscillator that is frequency-modulated by a random noise signal. The resulting noise-modulated FM signal is radiated from an antenna. If a target or other reflecting surface is within range, a portion of the radiated signal is returned to the fuze, where it is received and mixed with a portion of the local signal taken from the oscillator. It can be shown mathematically and empirically that the mixer output signal consists of a noise signal having its maximum energy density at zero frequency, the energy per unit bandwith decreasing with increase in frequency. It can similarly be shown that the frequency spectrum of this mixer-output noise signal depends on the round-trip fuze-to-target-to-fuze transmission time of the radio signal, and thus upon the fuze-to-target distance; when the target is at a great distance the mixer-output noise spectrum is relatively broad, but as the fuze approaches the target the spectrum becomes more compressed — i.e., the percentage of energy at the higher frequencies decreases. This mixer-output noise signal, after suitable amplification, can be fed to a "spectrum ratio" detection system that is adapted to produce a detonator-firing signal when the energy in two different frequency bands attains a certain predetermined ratio; this predetermined ratio is attained only at a desired predetermined fuze-to-target distance.

Noise fuzes of the type described above are relatively immune to enemy countermeasures. However, the shape of the mixer-output noise spectrum has certain disadvantages. For the spectrum ratio detection system it is desirable to use a discriminator consisting of two tuned circuits peaked at somewhat different frequencies, and to arrange a detonator-firing circuit that will produce a detonator-firing signal when the energy passed by the lower-frequency tuned circuit becomes equal to that passed by the higher-peaked tuned circuit. In the above-described noise fuze this means that the two tuned circuits must have different gain-bandwidth products, since at all times the mixer-output noise energy per unit bandwidth decreases with increasing frequency. For reasons which need not be fully discussed at this time, such a spectrum-ratio detection system is more vulnerable to enemy countermeasures than a spectrum-ratio detection system in which the two tuned circuits have substantially identical gains and bandwidths.

An object of the present invention is to provide a noise-type radio proximity fuze having improved characteristics.

Another object is to provide methods and devices for so shaping the modulating signal of a noise fuze as to provide any desired shape for the spectrum of the mixer output signal.

A further object is to provide methods and devices for so shaping the modulating signal of a noise fuze as to provide a mixer output spectrum having relatively little energy near zero frequency and having most of its energy in a relatively narrow band not including zero frequency, said band to be peaked at a frequency that decreases as fuze-to-target distance decreases.

Still another object is to provide methods and devices for changing the amplitude probility distribution of an electrical noise or noise-like signal, to obtain a desired amplitude probability distribution.

My invention provides an improved noise fuze in which the mixer output spectrum may be designed to have any of various desirable shapes. Briefly, a preferred fuze in accordance with the invention has a modulating system that comprises: a source of random electrical noise that is preferably frequency-shaped by a band-pass filter or the like; a "soft" limiter or other nonlinear device — a crucial element of the invention — for further shaping the noise signal by altering its amplitude probability distribution; and an integrator circuit for integrating the resulting signal before it is applied to the fuze oscillator to produce frequency modulation. As will more clearly appear below, this modulation scheme results in a relatively narrow-band mixer output spectrum that is peaked at a frequency dependent upon fuze-to-target distance.

The specific nature of the invention as well as other objects, uses and advantages thereof will clearly appear from the following description and from the accompanying drawing, in which:

FIG. 2A is a curve of the probability distribution P(A) of the instantaneous amplitude A of the signal from the random noise generator of FIG. 1.

FIG. 2B is a curve showing the frequency spectrum W(F) of the energy from a typical random noise generator of FIG. 1.

FIG. 3A is a curve of the probability distribution P(A) of the instantaneous amplitude A of the shaped-noise output of the bandpass filter 21 of FIG. 1.

FIG. 3B is a curve showing the frequency distribution of shaped-noise output of the bandpass filter 21 of FIG. 1.

FIGS. 4A, 4B, 4C are curves giving examples of various kinds of input-output characteristics that may be selected for limiter 22 of FIG. 1.

FIGS. 5A, 5B, 5C correspond to FIGS. 4A, 4B, 4C respectively and are curves illustrative of various different amplitude probability distributions that may be obtained at the output of limiter 22 by the selection of appropriate input-output characteristics for limiter 22.

Figure 1:
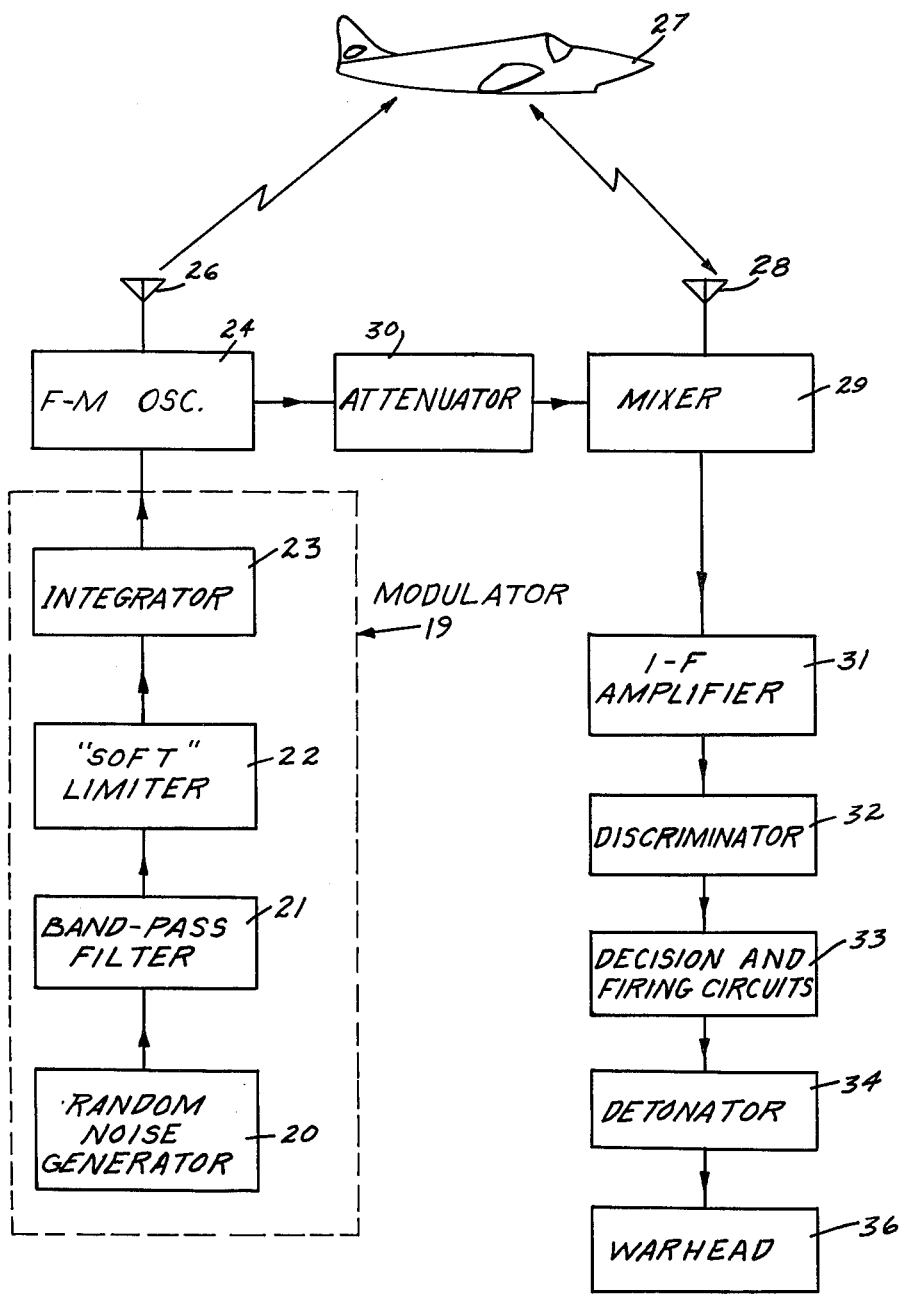
FIG. 1 is a block diagram of a fuze system in accordance with the invention.

FIG. 6 is a representative curve of output voltage versus time for the limiter 22 of FIG. 1.

FIG. 7 is a curve showing the signal of FIG. 6 after integration by integrator 23 of FIG. 1.

FIG. 8 is a pair of curves showing the instantaneous transmitted and received signals versus time for the fuze of FIG. 1, when the fuze oscillator 24 is modulated by the signal of FIG. 7.

FIG. 9 is a curve showing difference-frequency versus time for the transmitted and received signals of FIG. 8.

FIG. 10 is a curve of the output spectrum W(F) of mixer 29 in FIG. 1 when the mixer input signal has the characteristics illustrated in FIGS. 8 and 9.

Figure 11:
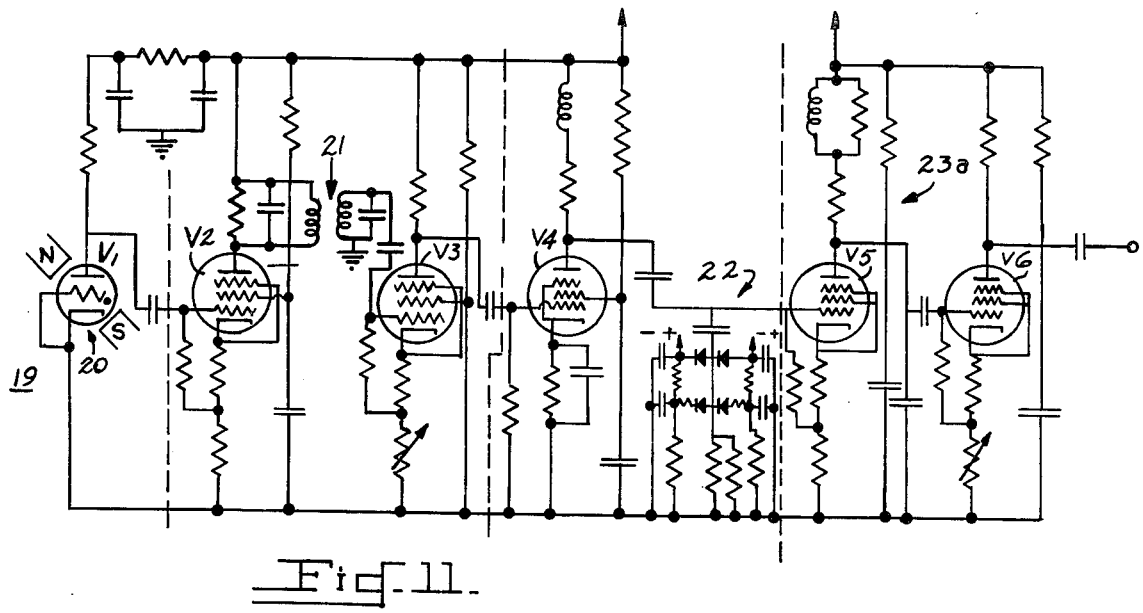

FIG. 11 is a schematic diagram of a typical modulator section of a fuze in accordance with the invention.

Figure 12:
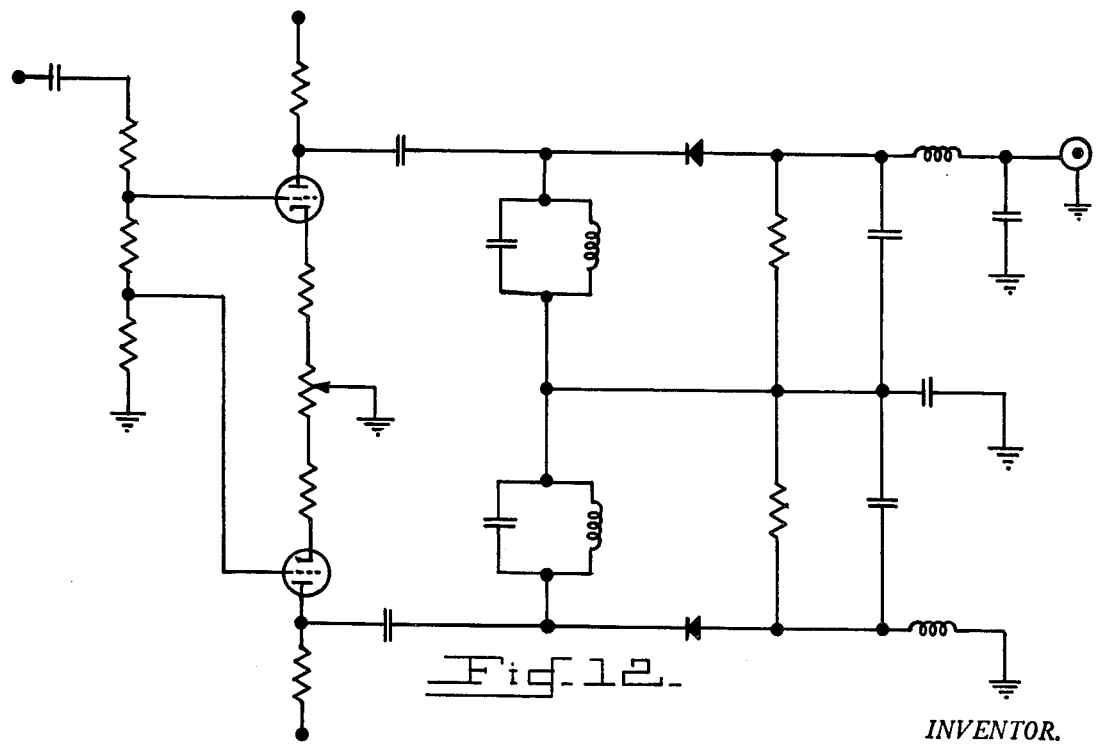

FIG. 12 is a schematic diagram of a discriminator that may be used in the fuze of the invention.

In FIGS. 1 and 11 a modulator 19 comprises a random noise generator 20, a band-pass shaper 21, a "soft" limiter 22, and an integrator 23. The output signal from modulator 19 frequency-modulates an oscillator 24 the output of which is connected to a transmitting antenna 26. Part of the energy radiated from antenna 26 strikes a reflective target 27 and is returned to a receiving antenna 28. A mixer 29 mixes the returned signal from antenna 28 with a local signal taken from oscillator 24 through a suitable attenuator 30. The resulting difference-frequency mixer-output signal is amplified by an intermediate-frequency amplifier 31 and applied to a discriminator 32. As the fuze approaches target 27 the frequency spectrum of the output of mixer 29 changes. If this spectrum changes in a certain manner and attains certain characteristics, decision and firing circuits 33 recognize that these changes have occurred and that these characteristics have been attained; circuits 33 thereupon cause the firing of a detonator 34, which in turn causes the explosion of a warhead 36.

Bandpass shaper 21 modifies the frequency characteristics of the random noise signal from generator 20, and limiter 22 modifies the amplitude probability characteristics of the signal passed by shaper 21. Limiter 22, because of its nonlinear characteristics, also modifies the frequency spectrum of the noise it passes to some extent, but this effect is not particularly important for present purposes.

FIG. 2A shows the amplitude probability distribution of a random noise signal that may be produced by generator 20, and FIG. 2B shows the frequency spectrum of the same signal.

FIGS. 3A and 3B give corresponding information for the signal passed by filter 21. Filter 21 may affect the level of the signal and thus change the scale of the amplitude probability distribution; but filter 21's principal function is to cause a peaking of its frequency spectrum.

FIG. 4A is an input-output characteristic of a "soft" limiter suitable for use as limiter 22 of FIG. 1. FIG. 4B is a similar characteristic of a "hard" limiter that gives essentially only two output voltages regardless of the extremes of the input voltage. FIG. 4C is a similar characteristic of a limiter or nonlinear device having additional flattened portions.

FIGS. 5A, 5B, and 5C are amplitude probability distributions of the output of limiter 22 corresponding to the input-output characteristics of FIGS. 4A, 4B, 4C respectively. It will be noted and understood that each horizontal flattened portion of the input-output characteristic tends to produce a peaking of P(A).

FIG. 6 is a representative curve showing the variation of the output voltage of limiter 22 with time. It will be seen and understood that, if limiter 22 is "hard" (FIG. 4B) its output voltage will approach a square wave, and that the corners of the square wave become rounded if the limiter is made "softer". It will also be seen and understood that the limiter output voltage shifts from its upper to its lower value at irregular intervals, the length of these intervals depending upon the frequency characteristics of the input noise voltage as shaped by filter 21; the higher the frequency at which filter 21 is peaked the higher will be the frequency of the input noise voltage and thus the shorter will be the average interval, and the narrower the band passed by filter 21 the lower will be the frequency of the input noise voltage and thus the more uniform will be the time intervals. Because irregularity of these time intervals is generally desirable within certain limits, filter 21 should not in general be sharply peaked. I tentatively prefer a tuned circuit with a "Q" of about 5 for use in certain desirable fuzes in accordance with the invention.

FIG. 7 shows the output voltage of integrator 23 versus time for the same time interval covered in FIG. 6.

FIG. 8 shows the transmitted frequency (antenna 26) and the received frequency (antenna 28) versus time for the same time interval as that covered by FIGS. 6 and 7. It will be understood that — assuming oscillator 24 to have a linear frequency deviation versus modulating voltage characteristic — the shapes of the two curves of FIG. 8 will be identical to the curve of FIG. 7. It will also be understood that all of the approximately straight-line rising portions of all three curves are approximately parallel; that all of the straight-line falling portions of all three curves are parallel; that the curves reverse their direction with each change in polarity of the voltage (FIG. 6) applied to integrator 23; that the sharpness of these reversals depends upon the "hardness" of limiter 22; and that the instantaneous difference frequency between the transmitted and received signals, during time intervals in which both are changing at a substantially constant rate, is substantially proportional to the fuze-to-target-to-fuze signal transit time and thus to fuze-to-target distance.

FIG. 9 is a curve of instantaneous difference frequency versus time for the transmitted and received signals of FIG. 8 — i.e., for the output signal from mixer 29.

FIG. 10 is a frequency spectrum of the mixer 29 output signal of FIG. 9. It will be understood that this spectrum moves lower in frequency and becomes more sharply peaked as fuze-to-target distance decreases. It will also be understood that this spectrum tends to become broader as (a) the frequencies passed by filter 21 are made higher in relation to the center frequency $F_c$ of oscillator 24 or as (b) limiter 22 is made "softer". Skilled persons will further understand in the light of what has been said above, particularly in connection with FIGS. 4C and 5C, that the mixer output spectrum may be made plural-peaked by appropriate choice of the input-output characteristic of non-linear device 22. In the light of the foregoing teaching, skilled persons will be able to provide a variety of devices 22 using known circuits and elements, having the necessary input-output characteristics to provide any of a number of desired characteristics for the amplitude probability distribution of the output of device 22, for the modulating signal at the output of integrator 23, and for the spectrum of the output of mixer 29.

Amplifier 31 may be conventional. Discriminator 32 may be of a conventional type that provides an output of one polarity when the mixer output spectrum is peaked above a certain frequency and of the opposite polarity when the mixer output spectrum is peaked below that frequency. Decision and firing circuits 33 may conveniently be designed to recognize when the output of discriminator 32 passes through zero after first having attained a predetermined level other than zero, and to thereupon fire detonator 34, which in turn causes warhead 36 to explode. If the fuze is designed to have a double-peaked mixer output spectrum, circuits 33 may be designed to become sensitized when the first — i.e., lower-frequency — peak passes through a predetermined frequency and to thereafter cause firing of detonator 34 when, with continuing approach of the fuze to the target, the second peak passes through the same frequency. Such a fuze is particularly immune to enemy countermeasures.

It will be understood that fuzes in accordance with the invention are highly immune to countermeasures because an enemy would find it very difficult to generate a jamming signal which, when received by antenna 28 and mixed with the unpredictably-modulated local signal from oscillator 24, would produce a mixer 29 output signal having the necessary characteristics to fire or dud the fuze.

FIG. 11 is a schematic diagram of a particular embodiment of modulator 19. In this embodiment random noise generator 20 comprises a gas diode in a magnetic field, band-pass filter 21 comprises a double-tuned circuit preferably having a Q of about 5, limiter 22 comprises an arrangement of resistances, capacitances, and diodes, and amplifier 23a has a gain that is essentially inversely proportional to frequency and thus serves as an integrator. The operation of the circuit of FIG. 11 will be sufficiently understood by skilled persons without more detailed description. FIG. 11 is shown only by way of example, as skilled persons will be able, in the light of the foregoing teaching, to construct innumerable varieties of modulator 19 within the scope of the invention.

FIG. 12 shows, by way of example only, a circuit that may be used for discriminator 32 (FIG. 1). Many suitable discriminators are well known. The operation of the circuit of FIG. 12 will be understood by skilled persons without further description.

It will be understood that many alternative schemes, not necessarily including discriminators, may be used to produce explosion of warhead 36 in response to changes in the output of mixer 29.

It will be apparent that the embodiments shown are only exemplary and that various modifications can be made in construction and arrangement within the scope of the invention as defined in the appended claims.

I claim as my invention:

1. An improved noise-modulated distance-measuring fuze comprising in combination: an oscillator; a transmitting antenna coupled to said oscillator for radiating a signal towards a target; a modulator coupled to said oscillator to cause frequency modulation thereof, said modulator comprising a random noise generator, a band-pass shaper connected to the output of said noise generator for frequency shaping the random noise output thereof, a limiter coupled to said band-pass shaper for amplitude shaping the frequency-shaped noise output thereof, an integrator coupled to said limiter for integrating the frequency-shaped and amplitude-shaped output thereof, and means connecting the output of said integrator to said oscillator in such a manner as to frequency modulate said oscillator; a receiving antenna adapted to receive a portion of the signal radiated from said transmitting antenna after reflection from a target; mixer means for mixing the received signal from said receiving antenna with a local signal taken from said oscillator to produce a difference-frequency mixer output signal, said mixer output signal having a frequency spectrum peaked at a frequency greater than zero that decreases with decrease of fuze-to-target distance, the frequency at which the mixer output signal is peaked and the broadness of the spectrum in the vicinity thereof for a given fuze-to-target distance being dependent upon the characteristics of said band-pass shaper and said limiter; and means coupled to said mixer and responsive to the frequency at which said mixer output signal is peaked for functioning the fuze at a predetermined fuze-to-target distance.

2. The invention in accordance with claim 1 wherein said last mentioned means comprises: an amplifier coupled to said mixer for amplifying the difference-frequency signal output thereof, a discriminator responsive to the output of said amplifier for providing an output of one polarity when the mixer output signal spectrum is peaked above a predetermined frequency and of the opposite polarity when the mixer output signal spectrum is peaked below said predetermined frequency, means coupled to the output of said discriminator for producing a firing signal when the output of said discriminator passes through zero after first having attained a predetermined level other than zero, and a detonator adapted to be fixed to function said fuze when said discriminator produces said firing pulse.

3. The invention in accordance with claim 1 wherein said limiter is so constructed and arranged that its output voltage approaches a square wave shifting between equal and opposite values at irregular intervals.

* * * * *